United States Patent [19]
Caruso et al.

[11] Patent Number: 5,392,972
[45] Date of Patent: Feb. 28, 1995

[54] MOTOR VEHICLE TRUNK PARTITION

[75] Inventors: Paul C. Caruso, Stevensville; Daniel Vandersluis; Anthony J. Blommel, both of St. Joseph; Joseph P. Fannon, Washington; Daniel J. Pauluk, St. Joseph, all of Mich.

[73] Assignee: Atlantic Automotive Components, Benton Harbor, Mich.

[21] Appl. No.: 88,519

[22] Filed: Jul. 7, 1993

[51] Int. Cl.$^6$ .............................................. D60R 7/00
[52] U.S. Cl. .......................... 224/42.034; 224/42.033; 224/311
[58] Field of Search ............... 224/42.34, 42.33, 42.42, 224/311, 314; 220/4.29; 296/37.5, 37.6, 66

[56] References Cited

U.S. PATENT DOCUMENTS

| | | | |
|---|---|---|---|
| 1,179,445 | 4/1916 | Manning | 296/37.5 |
| 1,378,610 | 5/1921 | Perkins | 224/42.34 X |
| 1,429,197 | 9/1922 | Dyett | 224/42.34 |
| 4,189,056 | 2/1980 | Majewski | 224/42.42 X |
| 4,531,773 | 7/1985 | Smith | 296/37.6 X |

Primary Examiner—Henry J. Recla
Assistant Examiner—David J. Walczak
Attorney, Agent, or Firm—Brooks & Kushman

[57] ABSTRACT

A collapsible partition for the trunk of a motor vehicle includes a transverse extending wall member to which side wall members are pivotably mounted. The collapsible partition is secured within the trunk of the motor vehicle by a pair of straps which are secured at a first end to the transverse wall member and at the second end to anchors located within the vehicle trunk. A liner is also provided and is secured to a bottom portion of the transverse and side wall members for defining a bottom for the partition device.

14 Claims, 4 Drawing Sheets

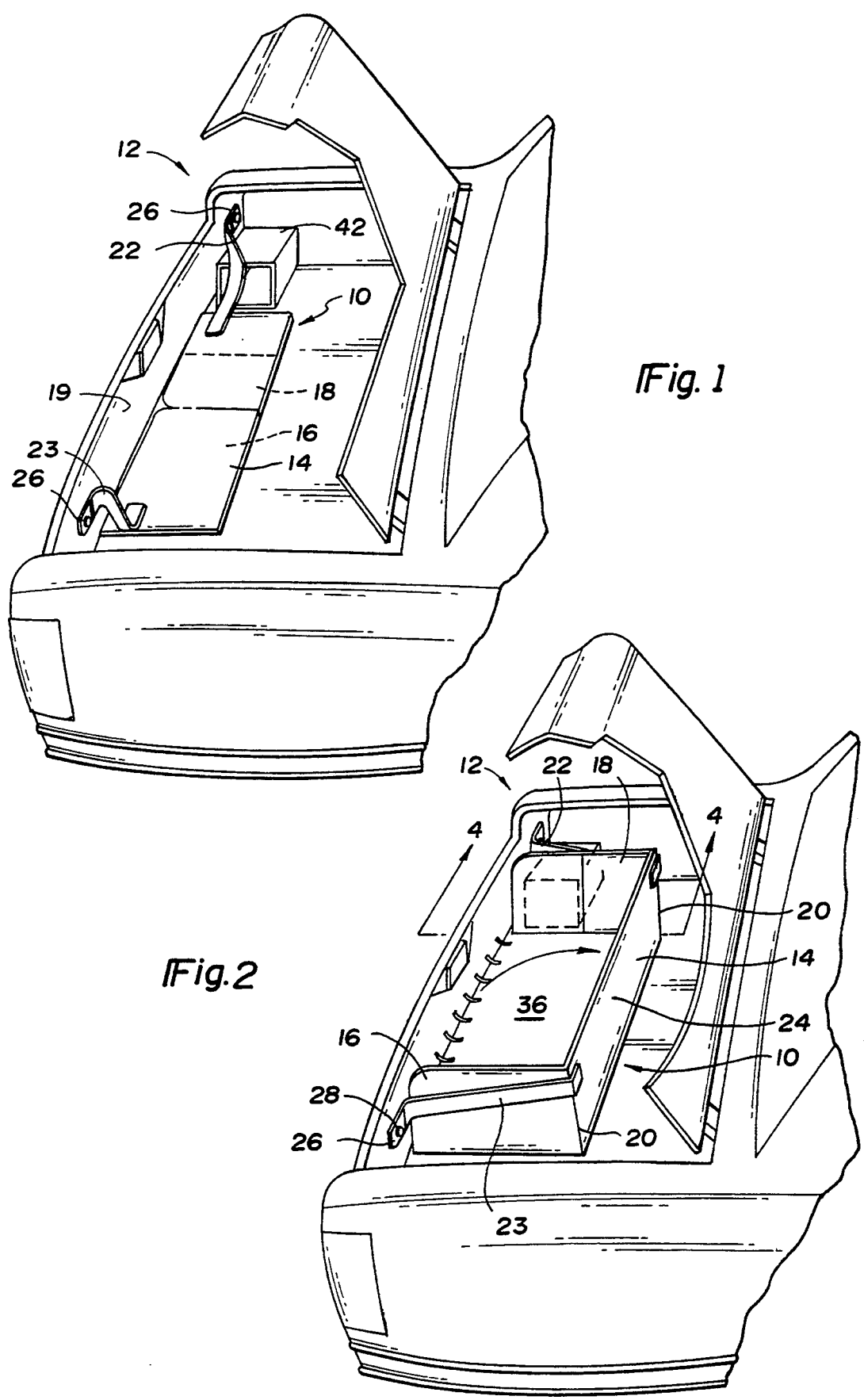

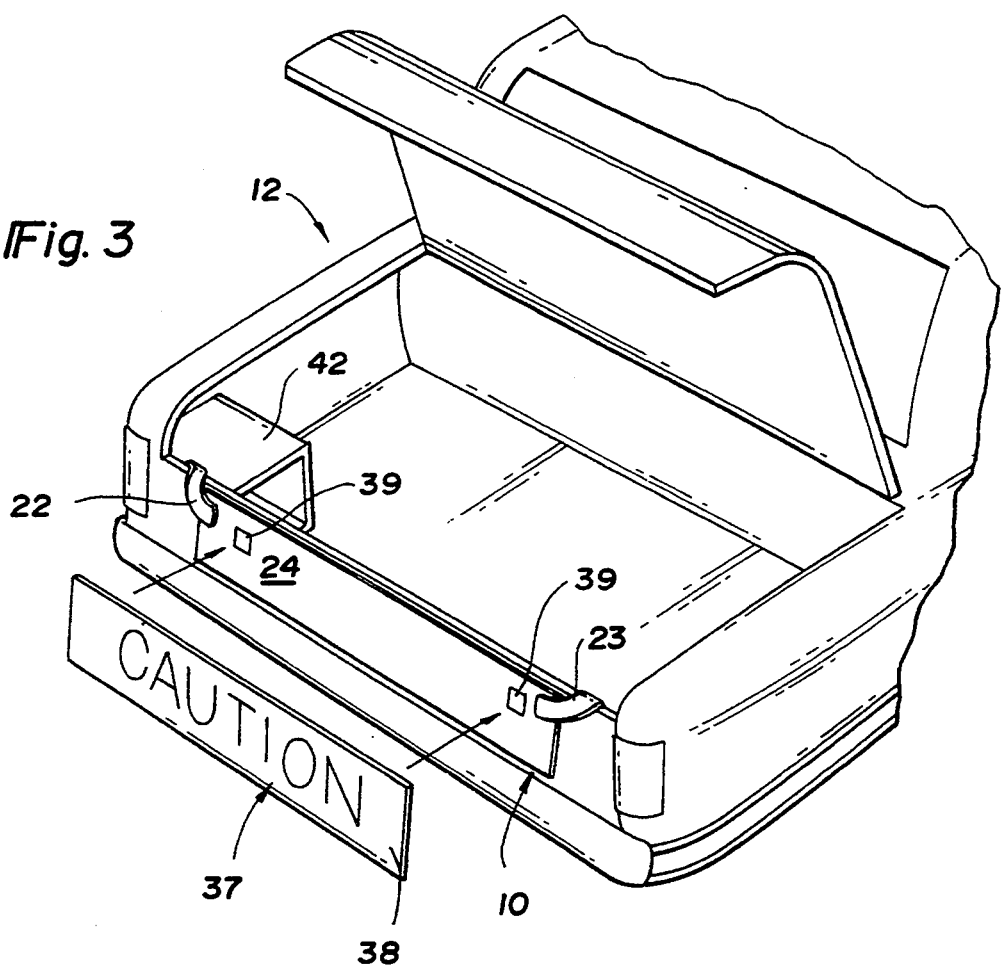
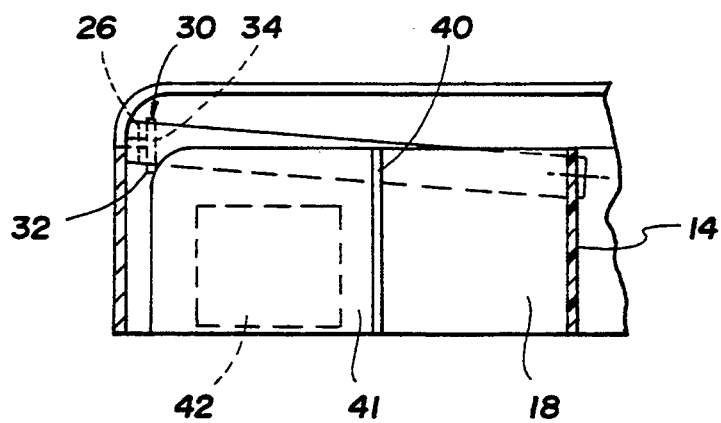

MOTOR VEHICLE TRUNK PARTITION

BACKGROUND OF THE INVENTION

This invention relates generally to an organizer for a motor vehicle trunk, and more particularly, to a partition disposed within the trunk of a motor vehicle for retaining small items from moving about in the trunk and which can be collapsed to an out of the way stowed position when the full trunk area is required.

In response to consumer demand for more-storage space, manufacturers are continually improving motor vehicle designs to maximize the amount of room available for passengers and stowage of passenger belongings. This is particularly true with the trunks of automobiles where the manufacturers have made great strides in increasing available stowage space. Unfortunately, as trunk space increases, it becomes more difficult to carry smaller items within the trunk without having them jostled about while driving the vehicle. A particular difficulty exists with carrying groceries because the bags have a tendency to fall over as the vehicle accelerates, decelerates or maneuvers through turns. When the bags fall over, the groceries often spill out into the trunk and in some cases may be damaged. In spite of this problem, consumers have often indicated that the preferred area for carrying items is in the trunk over, for example, the rear passenger seat. A similar problem with carrying small items also exists with mini-vans, station wagons and hatchback vehicles.

Larger trunks also pose ergonomic difficulties for a person lifting items from the trunk. If the item moves forward in the trunk area, the person must bend over the edge of the trunk and lift the item away from their body. This creates an awkward lifting position. It would be better if smaller items could be retained near the edge of the trunk so that they may be more easily lifted from the trunk.

Several partition devices have been designed to fit into hatchback vehicles or station wagons for dividing the large storage area into smaller storage areas. The devices can generally be stowed within the storage area when the full area is required or deployed into partitions when it is desirable to carry smaller items. One such partition device is disclosed in U.S. Pat. No. 4,718,584 issued Jan. 12, 1988 to Schoeny. The device disclosed therein consists of a base member to which a back flap member is hinged. The back flap member could be raised and secured with a latch device to define a partition. Side members were also provided and hinged to the back flap member and can be folded out and latched to form 90 degree angles to the back flap and thereby define three smaller storage areas. The partition device is inserted into the back of a hatchback vehicle and is sized to fit closely to the inner walls of the vehicle storage area to prevent it from moving around. In addition, velcro may be used to further secure the partition device to a carpeted floor of the compartment. A disadvantage of such a partition device is that it must be uniquely sized to fit particular vehicles and is not easily removed from the vehicle.

Another partition device is shown in U.S. Pat. No. 4,540,213 issued Sep. 10, 1985 to Herlitz et al. The device disclosed therein includes slats secured to the floor of the storage space of a station wagon and which serve as cargo skids when in the stowed position. The slats can be raised and secured to define partitions within the storage area for stowing smaller items. As with the above described partition device, this device also suffers from the disadvantage of having to be designed to fit a particular vehicle and can not be removed from the vehicle.

As can be further appreciated, any partition device for dividing the trunk of a motor vehicle should have a minimal number of parts in order to keep production costs low. The device should also be adaptable to most any motor vehicle storage area without requiring modification to the vehicle.

Accordingly, the present invention provides a low cost collapsible partition device which is adaptable to the trunks of many motor vehicles. In a preferred embodiment, the device makes advantageous use of anchors or other tie down means frequently included within the storage areas of motor vehicles and therefore does not require modifications to the motor vehicle storage areas. In a second preferred embodiment, the device is easily adapted to the trunk of a vehicle with few modifications.

SUMMARY OF THE INVENTION

Thus, in accordance with the present invention there is provided a collapsible partition for motor vehicle trunks which includes a transverse extending wall member to which side wall members are pivotably mounted. The collapsible partition is secured within the trunk of the motor vehicle by a pair of straps which are secured at a first end to the transverse wall member and at the second end to anchors located within the vehicle trunk. A liner is also provided and is secured to a bottom portion of the transverse and side wall members for defining a bottom for the partition device.

It is an object of the present invention to provide a collapsible partition device which may be used to simply and easily divide the large trunk area of a motor vehicle into smaller areas.

A further object of the present invention is to provide a collapsible partition device which is adaptable to most any motor vehicle trunk.

Yet another object of the present invention is to provide a collapsible partition device which may be further used as a signal device.

Still another object of the present invention is to provide a collapsible partition device which can be set up by a person using one hand.

BRIEF DESCRIPTION OF THE DRAWINGS

These and other advantages, objects and features of the present invention will become apparent to those skilled in the art by referring the following written description and drawings in which:

FIG. 1 is a perspective view of a trunk of a motor vehicle partially broken away to reveal the collapsible partition device of the present invention shown in the collapsed or stowed position;

FIG. 2 is a view similar to that of FIG. 1 showing the collapsible partition device of the present invention in an deployed position;

FIG. 3 is a rear view of the trunk showing the collapsible partition of the present invention positioned outside of the trunk for providing a caution sign;

FIG. 4 is a is a sectional view taken along line 4—4 of FIG. 2;

DETAILED DESCRIPTION OF THE PREFERRED EMBODIMENT

Figure 5:
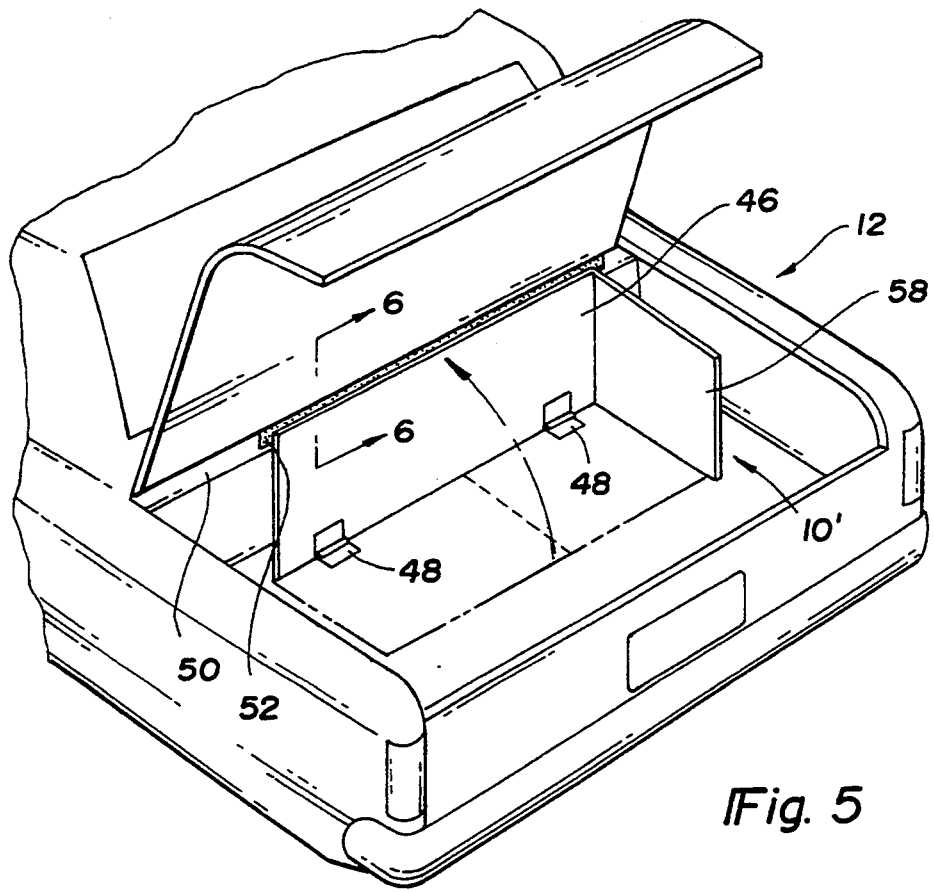
FIG. 5 is a perspective view of a motor vehicle trunk and illustrating a trunk partition device according to a second embodiment of the present invention with the partition shown in a raised position and shown in phantom in a stowed position.

In general, the present invention is directed to a motor vehicle trunk partition 10 which can be collapsed into a folded stowed position and which may be deployed to partition a trunk of a motor vehicle into smaller stowage areas. The present invention is described with reference to preferred embodiments adapted for use with motor vehicles having a trunk. However, it should be appreciated that the teachings of the present invention are not so limited and may be adapted to partition devices for use in the storage areas of any number of vehicle types.

Referring to FIG. 1, the partition device 10 is shown stowed in the trunk opening 12 of an exemplary motor vehicle. In the stowed position, partition device 10 is positioned within the trunk and lies essentially flat on the floor of the trunk. In FIG. 2, partition device 10 is shown deployed within the trunk with transverse wall member 14, right and left side wall members 16 and 18, respectively, and rear wall 19 of trunk 12 defining a reduced size storage area.

Side walls 16 and 18 are pivotably mounted to transverse wall 14 and can thus swing inwardly against transverse wall 14 for collapsing partition 10 and placing it in the stowed position shown in FIG. 1. In the preferred embodiment, transverse wall 14 and side walls 16 and 18 are constructed from a flat piece of woodstock or other substantially rigid wood pulp product covered with appropriate upholstery (not shown) for matching the carpeting material typically found within vehicle trunks. Side walls 16 and 18 are further joined to transverse wall 14 by a living hinge 20 defined by a locally compressed area of the woodstock material or the carpet fabric itself for allowing pivoting motion of side walls 16 and 18 with respect to transverse wall 14. It should be understood, however, that other structural materials, such as corrugated plastic or other suitable material, may be substituted for the woodstock product for constructing partition device 10.

Partition device 10 is retained from forward movement within trunk 12 by retaining straps 22 and 23 secured to the forward surface 24 of transverse wall 14 and to the rear wall 18 of trunk 12. Straps 22 and 23 are preferably made of woven nylon webbing. Straps 22 and 23 may also include an adjustment mechanism for changing the length of the straps and further securing the partition device 10 in the trunk. The adjustment mechanism may be buckles, velcro loops or other such mechanisms known in the art. Straps 22 and 23 may further include a quick disconnect mechanism, such as buckle or the like, for providing easy removal of partition device 10. The straps 22 and 23 are secured to surface 24 at a first end by sewing, gluing or the like. Such an adjustment would advantageously allow for adaptation to other vehicles if desired. At a second end a retaining ring 26 is secured to straps 22 and 23 by a loop of material passing through an aperture formed in ring 26 and secured back to straps 22 and 23 by a suitable means. Ring 26 is further formed with an aperture 28 which is adapted to engage anchors fixed to trunk rear wall 18. One type of anchor device is a knob 30 having an enlarged head 32 and a threaded aperture 34 which engages a stud attached to trunk rear wall 19. Such anchors are commonly found on automotive vehicles and, for example, on the Ford Motor Company Lincoln Mark VIII. Other anchoring devices such as screws, lag bolts, or the like, would also be used if pre-existing studs are not available on the installation vehicle.

Figure 7:
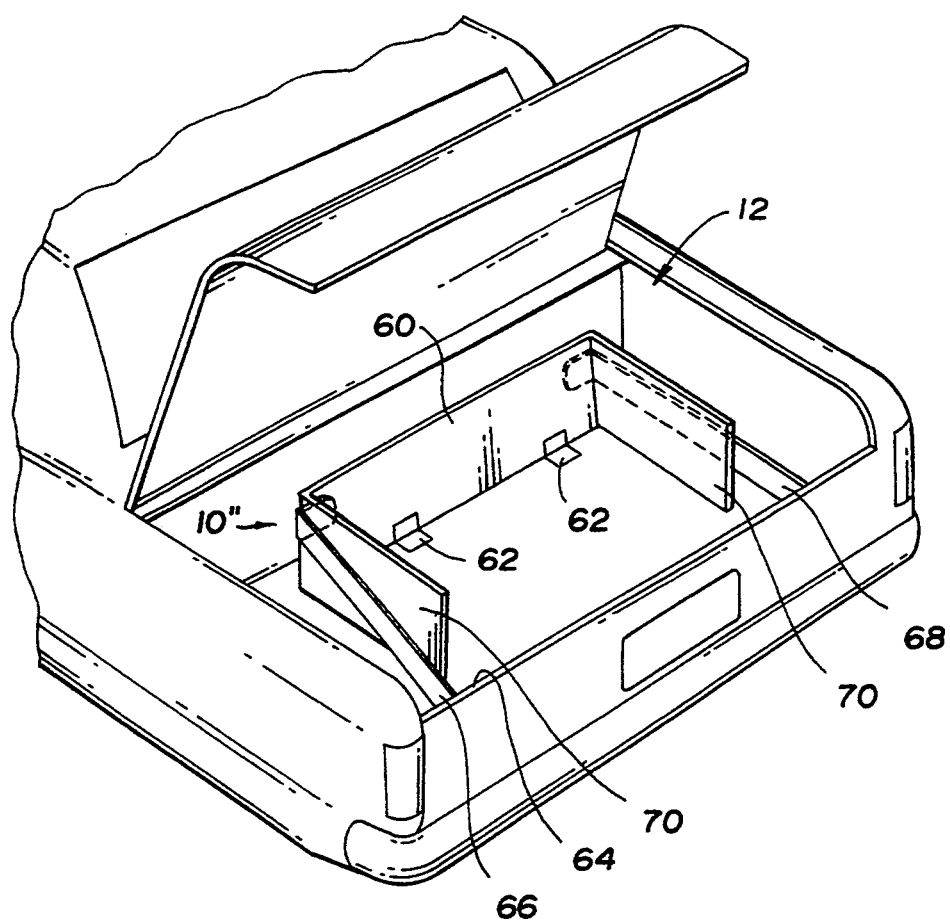
FIG. 7 is a perspective view of a motor vehicle trunk and illustrating a third embodiment of the trunk partition of the present invention.

Further shown in FIG. 2, in the preferred embodiment partition device 10 includes a liner 36 which may be constructed of nylon or similar material. Liner 36 is sewn along its forward and side edges to the base of transverse wall 14 and side walls 16 and 18, respectively. Liner 36 assists in retaining items within partition device 10 by preventing lifting motion of transverse wall 14 from the floor of trunk 12 thus allowing items to pass under transverse wall 14 and into the remaining trunk area. The nylon material may also be made liquid tight such that liner 36 operates to contain spills within partition device 10 and thus prevent inadvertent spills from soiling the carpeting within trunk 12. In a preferred embodiment, the partition device 10 is free standing, i.e., not attached to the trunk except by straps 22 and 23. However, it is within the scope of the present invention, and if desired, partition device 10 could also be removably attached to the base of the trunk in its deployed position or hingedly attached at its base (FIG. 7). In addition, in the stowed position, several pieces of velcro type hook and loop fastener material, or the like, may be placed on the base of partition device 10 to secure it to the carpeted floor of the trunk and prevent it from moving about.

As seen in FIGS. 2 and 4, left side wall 18 is further formed with an additional living hinge 40. Living hinge 40 allows a small portion 41 of side wall 18 to be pivoted to allow access to items stowed along the outer walls of trunk 12 without having to fully collapse and stow partition device 10. For example, in FIG. 4 a compact disk changer 42 (shown in phantom) is secured within trunk 12 and may be accessed by pivoting portion 41 of side wall member 18 inwardly.

As will be readily appreciated by those skilled in the art, the pivotal attachments or the like could be utilized in place of the living hinges recited herein. Thus, other types of hinge type attachments could be utilized without deviation from the scope of the present invention.

With reference to FIG. 3, partition device 10 is shown inverted and external to trunk 12. In this position a message 37, such as "CAUTION" or the like, printed on card 38 can be secured to surface 24 of transverse wall 14 by velcro fasteners 39 or the like for display to passing motorists. In the inverted and external position, partition device 10 remains in a substantially folded state and abuts the outer portion 44 of trunk rear wall 19 and is retained to trunk 12 by straps 22 and 23. Thus, partition device 10 is further adaptable as a signaling device should the vehicle operator require roadside assistance or the like.

In operation, with the partition device 10 in its stowed position, i.e., the side walls 16 and 18 folded underneath transverse wall 14 and the unit lying flat in the trunk, the person need only lift up the partition in a generally vertical direction allowing the side walls to drop down generally perpendicular to the transverse wall 14. The partition is then simply manually actuated back into its deployed position, and groceries and the like may be placed within the confines of partition device 10.

Figure 6:
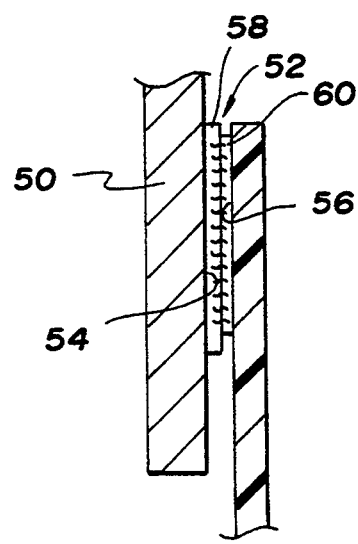
FIG. 6 is a section taken along line 6—6 of FIG. 5 showing how the partition shown in FIG. 5 is secured in the raised position.

With reference to FIGS. 5 and 6, partition device 10' is shown illustrating a second embodiment of the present invention. In FIG. 5, a transverse wall member 46 is shown pivotably mounted to the floor of trunk 12 by hinges 48. Transverse wall 46 may therefore be pivoted between an essentially flat stowed position (shown in phantom) and a raised position. In the raised position, and best seen in FIG. 6, transverse wall 46 is retained to an upper surface 50 of trunk 12 by engagement of velcro type hook and loop fastener or the like material 52 secured to transverse wall 46 and upper surface 50. Upper surface 50 is formed with a generally vertical flanged stop 54 to which a mating portion 58 of velcro material 52 is secured. The complementary portion of velcro material 60 is then secured to an edge portion 56 of transverse wall member 46 such that transverse wall member 46 may be removably secured in a deployed position. This arrangement of partition device 10 provides for conveniently dividing a large motor vehicle trunk into smaller compartments, and thus reduces movement of items stored in the trunk as a result of operating the motor vehicle and retains the items nearer to the trunk edge. Side wall members 58, only one of which is shown, may also be pivotably attached, such as by a living hinge as previously described, to each end of transverse wall member 46 for limiting side to side movement of items within the trunk.

With reference to FIG. 7, partition device 10" is shown illustrating a third embodiment of the present invention. In FIG. 7, a transverse wall member 60 is shown pivotably mounted to the floor of trunk 12 by hinges 62. As with the preceding embodiments, transverse wall 60 may therefore be moved between an essentially flat stowed position and a raised position. In the raised position, and as shown in FIG. 7, transverse wall 46 is retained to an upper surface 64 of trunk 12 by engagement of straps 66 and 68 with trunk upper surface 64 in a manner similar to that previously described with respect to the first embodiment. Side wall members 70 are also provided and are pivotably attached, as previously described, to each end of transverse wall member 60 for defining a small area in the trunk for stowage of smaller items.

While the above description discusses preferred embodiments of the present invention, it will be understood that the description is exemplary in nature and is not intended to limit the scope of the invention. The present invention will therefore be understood as susceptible to modification, alteration, and variation by those skilled in the art without deviating from the fair scope of the invention as defined in the following claims.

What is claimed is:

1. A collapsible partition for a motor vehicle trunk wherein the trunk includes a rear wall, outer walls and a bottom, the collapsible partition comprising:
   a transverse extending wall member disposed within the trunk;
   longitudinal extending side wall members pivotably secured to the transverse wall member;
   retaining straps secured to the transverse wall member and adapted for securement to the rear wall of the motor vehicle trunk whereby the collapsible partition is retained within the motor vehicle trunk.

2. The collapsible partition of claim 1 further comprising liner means secured to the transverse wall and the side wall members for defining a bottom member for the collapsible partition.

3. The collapsible partition of claim 2 further comprising means for removably attaching the collapsible partition in a deploy position to the bottom of the trunk.

4. The collapsible partition of claim 2 wherein the liner means is liquid tight.

5. The collapsible partition of claim 1 wherein said vehicle trunk further includes a storage area between said outer wall of said trunk and one of the side wall members, and said one of the side wall members further comprises hinge means for providing access to said storage area.

6. The collapsible partition of claim 1 further comprising means for displaying a message disposed on the transverse wall member whereby the collapsible partition may be positioned external to the trunk such that the message is visible to a passerby.

7. The collapsible partition of claim 6 wherein said means further comprises a message card removably attached to said transverse wall member.

8. The collapsible partition of claim 1 wherein the transverse extending wall is hingedly secured to the floor of the trunk.

9. The collapsible partition of claim 1 further comprising means for adjusting the length of the straps.

10. The collapsible partition of claim 1 further comprising means for quickly disconnecting the straps for removing the partition device from the trunk.

11. The collapsible partition of claim 1 further comprising means for securing the partition device to the trunk in a stowed position.

12. The collapsible partition of claim 11 wherein said securing means comprises hook and loop type fasteners.

13. A collapsible partition for a motor vehicle trunk, the trunk having an upper portion and a bottom, comprising:
   a transverse partition member pivotally mounted to the bottom of the trunk;
   a flanged stop formed on the upper portion of the trunk for mating to an edge of the transverse partition member and a hook and loop fastener disposed therebetween for removably securing the transverse partition in a deployed position; and
   side wall members pivotally attached to the transverse partition member.

14. A collapsible partition for a motor vehicle trunk, the trunk having an upper portion and a bottom, comprising:
   a transverse partition member pivotally mounted to the bottom of the trunk;
   straps secured between the transverse partition member and the upper portion of the trunk for detachably securing the partition member in a substantially upright position and for releasing the partition member for placing the partition member in a stowed position; and
   sidewall members pivotally attached to the transverse partition member.

* * * * *